(12) United States Patent
Fusconi et al.

(10) Patent No.: US 12,459,559 B2
(45) Date of Patent: Nov. 4, 2025

(54) STEERING ASSIST METHOD AND APPARATUS

(71) Applicant: Jaguar Land Rover Limited, Coventry (GB)

(72) Inventors: Denis Fusconi, Coventry (GB); Robyn Caldwell, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 475 days.

(21) Appl. No.: 17/296,508

(22) PCT Filed: Nov. 5, 2019

(86) PCT No.: PCT/EP2019/080167
§ 371 (c)(1),
(2) Date: May 24, 2021

(87) PCT Pub. No.: WO2020/104181
PCT Pub. Date: May 28, 2020

(65) Prior Publication Data
US 2022/0032994 A1 Feb. 3, 2022

(30) Foreign Application Priority Data
Nov. 22, 2018 (GB) .................................... 1819031

(51) Int. Cl.
*B62D 6/10* (2006.01)
*B62D 5/04* (2006.01)
(52) U.S. Cl.
CPC ............. *B62D 5/0463* (2013.01); *B62D 6/10* (2013.01)
(58) Field of Classification Search
CPC ................................ B62D 5/0463; B62D 6/10
(Continued)

(56) References Cited

U.S. PATENT DOCUMENTS

2006/0047390 A1* 3/2006 Scherl .................. B60W 30/12
701/41
2010/0191421 A1* 7/2010 Nilsson ................. B62D 6/003
701/41
(Continued)

FOREIGN PATENT DOCUMENTS

CN 101175662 A 5/2008
CN 101959743 A 1/2011
(Continued)

OTHER PUBLICATIONS

Wang, Lane keeping based on location technology, Sep. 30, 2005, IEEE, IEEE Transactions on Intelligent Transportation Systems, vol. 6, Issue: 3 (Year: 2005).*
(Continued)

*Primary Examiner* — Matthias S Weisfeld
(74) *Attorney, Agent, or Firm* — McCoy Russell LLP

(57) ABSTRACT

Aspects of the present invention relate to a control system for controlling generation of a road edge assist steering torque at a steering wheel of a host vehicle. The control system includes one or more controllers. The control system is configured to determine a first width representing a width of a first lane of travel. The determined first width is compared to a predefined first threshold. The control system is configured to control generation of the road edge assist steering torque in dependence on the comparison of the first width and the first threshold. Aspects of the present invention also relate to a vehicle having a control system; and a method of controlling generation of a road edge assist steering torque.

18 Claims, 5 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 2011/0022317 | A1* | 1/2011 | Okita | G08G 1/161 |
| | | | | 701/301 |
| 2016/0311430 | A1 | 10/2016 | Sakamoto | |
| 2018/0022347 | A1* | 1/2018 | Myers | G06V 20/588 |
| | | | | 701/26 |
| 2018/0025234 | A1* | 1/2018 | Myers | G08G 1/167 |
| | | | | 348/148 |
| 2018/0037260 | A1* | 2/2018 | Otake | G05D 1/0055 |

FOREIGN PATENT DOCUMENTS

| | | | |
|---|---|---|---|
| CN | 104812647 | A | 7/2015 |
| CN | 105280022 | A | 1/2016 |
| CN | 105377657 | A | 3/2016 |
| CN | 106965807 | A | 7/2017 |
| CN | 107458465 | A | 12/2017 |
| CN | 107735309 | A | 2/2018 |
| CN | 107963078 | A | 4/2018 |
| DE | 102006047636 | A1 | 4/2008 |
| EP | 2295311 | A1 | 3/2011 |
| EP | 2949548 | A1 * | 12/2015 ............ B60W 30/08 |

OTHER PUBLICATIONS

McKnight, The effect of lane line width and contrast upon lanekeeping, Sep. 1998, Accident Analysis & Prevention vol. 30, Issue 5 (Year: 1998).*

Single-track road, Jul. 21, 2013, Wikipedia (Year: 2013).*

Great Britain Intellectual Property Office, Combined Search and Examination Report under Sections 17 and 18(3) Issued in Application No. GB1819031.4, Apr. 11, 2019, 6 pages.

ISA European Patent Office, International Search Report and Written Opinion Issued in Application No. PCT/EP2019/080167, Feb. 11, 2020, WIPO, 12 pages.

State Intellectual Property Office of the People's Republic of China, Office Action and Search Report Issued in Application No. 20198008911.8, Nov. 24, 2022, 35 pages. (Submitted with Partial Translation).

European Patent Office, Office Action Issued in Application No. 23204416.4, Mar. 19, 2025, Netherlands, 5 pages.

European Patent Office, Office Action Issued in Application No. 23204416.4, Jul. 25, 2025, Netherlands, 6 pages.

* cited by examiner

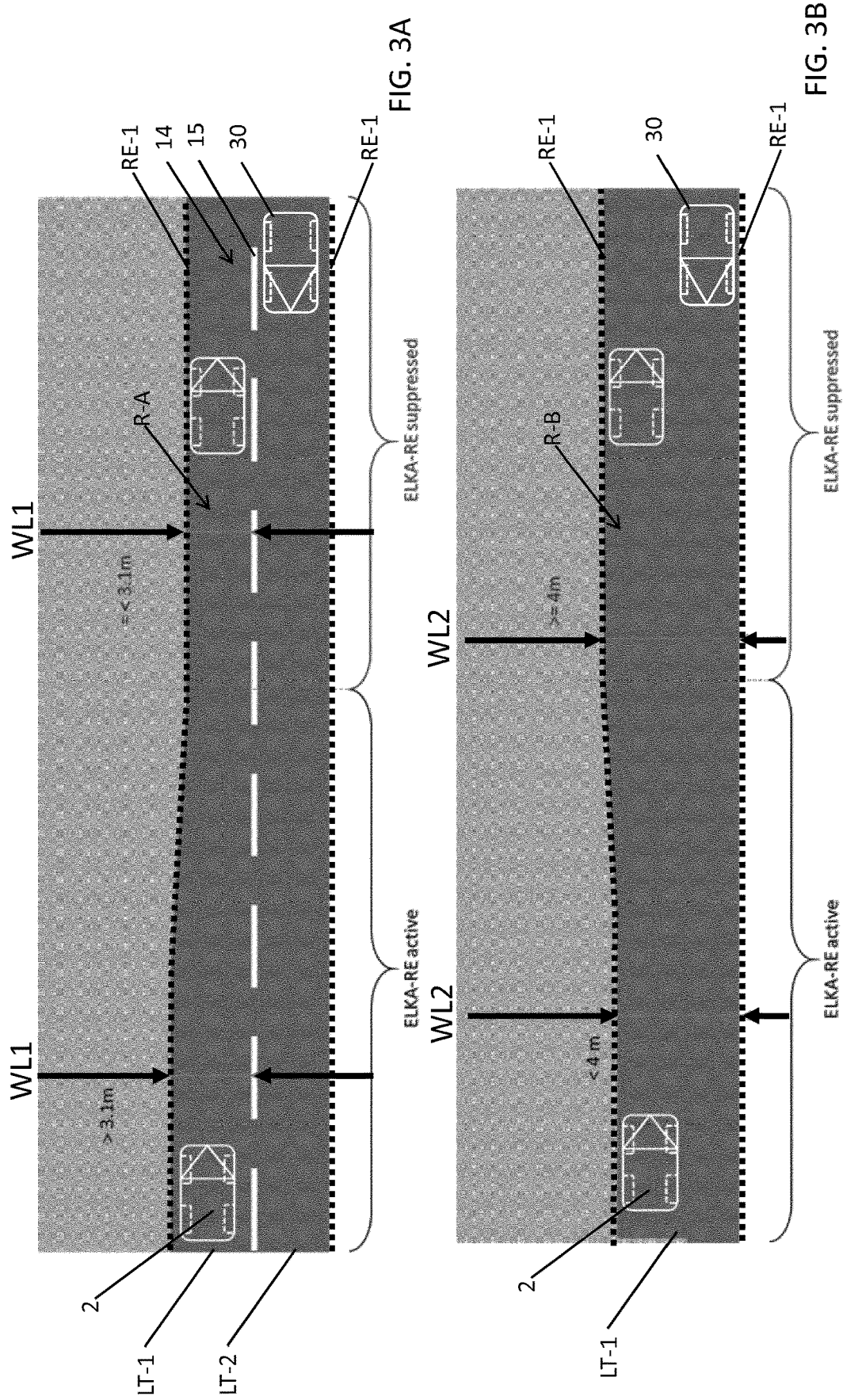

STEERING ASSIST METHOD AND APPARATUS

CROSS REFERENCE TO RELATED APPLICATIONS

The present application is a U.S. National Phase of International Application No. PCT/EP2019/080167 entitled "STEERING ASSIST METHOD AND APPARATUS," and filed on Nov. 5, 2019. International Application No. PCT/EP2019/080167 claims priority to Great Britain Patent Application No. 1819031.4 filed on Nov. 22, 2018. The entire contents of each of the above-listed applications are hereby incorporated by reference for all purposes.

TECHNICAL FIELD

The present disclosure relates to a steering assist method and apparatus. Aspects of the invention relate to a control system for controlling generation of an assist steering torque; a vehicle; a method of controlling an assist steering torque; and a non-transitory computer-readable medium.

BACKGROUND AND SUMMARY

It is known to provide a vehicle with a lane keep assist (LKA) systems that monitors lane edges for a vehicle and may intervene if the vehicle appears to be unintentionally leaving the lane. Variations of the systems may look at the lane boundaries which may comprise a soft limit, for example defined by road markings; or a hard limit, such as a physical road boundary. The activation of LKA systems can be perceived as an unnecessary steering intervention in certain driving scenarios, thereby reducing user comfort. For example, in scenarios in which the roads are narrow and the driver needs to intentionally bring the vehicle close to the road edge or even partially cross it to maintain a distance from the oncoming traffic. However, the LKA systems are designed to work from the recommendations from EuroNCAP according to which they should be active by default and cannot readily be turned off unless intentionally disabled by the driver. The LKA systems typically have a default OFF condition and revert back to a user setting in the next ignition cycle.

It is an aim of the present invention to address one or more of the disadvantages associated with the prior art.

Aspects and embodiments of the invention provide a control system for controlling generation of a road edge assist steering torque; a vehicle; a method of controlling generation of a road edge assist steering torque; and a non-transitory computer-readable medium according to the appended claims According to an aspect of the present invention there is provided a control system for controlling generation of a road edge assist steering torque at a steering wheel of a host vehicle; the control system comprising one or more controllers, the control system being configured to:
  determine a first width representing a width of a first lane of travel; and
  comparing the first width to a predefined first threshold; wherein the control system is configured to control generation of the road edge assist steering torque in dependence on the comparison of the first width and the first threshold. The road edge assist steering torque is generated as a driver assistance feature suitable for assisting the driver in the lateral control of the host vehicle. The road edge assist steering torque may be generated under emergency situations, for example if it is determined that the vehicle is about to cross a road edge unintentionally. The distance from the host vehicle to a road edge on each side of the host vehicle may be calculated dynamically, and the road edge assist steering torque generated to apply a steering intervention if it is determined that crossing a road edge is imminent. In use, the control system is provided on a host vehicle having a steering wheel for controlling a steering angle of one or more steering wheels. The road edge assist steering torque is applied to the steering wheel to help prevent the host vehicle partially or completely crossing the road edge. The road edge assist steering torque may be generated by a power assist steering system.

The control system may be configured to determine the width of the first lane of travel. For example, the control system may process data received from one or more sensors provided on the vehicle. The one or more sensors may be forward-facing on the host vehicle. The one or more sensors may comprise one or more of the following: an optical sensor, a RADAR system and a LIDAR system. The optical sensor may, for example, comprise a camera. The camera may, for example, operate in the visible spectrum or an infrared spectrum. Alternatively, or in addition, the control system may determine the width of the first lane of travel with reference to a mapping system, for example by cross-referencing a current geospatial location of the host vehicle with map data. The map data may be stored on the host vehicle or may be stored remotely and accessed over a wireless communication network.

The control system may be configured to control operation of the power assist steering system to control the road edge assist steering torque. The control system may generate a control signal for controlling operation of the power assist steering system. The power assist steering system may, for example, comprise an electric, mechanical or hydraulic system for generating the road edge assist steering torque.

The first threshold is a predefined value. The first threshold may, for example, be defined as 3.1 metres (120 inches). In a variant, the first threshold may be defined as 2.5 metres (100 inches).

The control system may be configured to suppress generation of the road edge assist steering torque in dependence on a determination that the first width is less than or equal to the first threshold. The control system may output a first road edge traversal signal for suppressing generation of the road edge assist steering torque. The first road edge traversal signal may be output to the power assist steering system.

The control system may be configured to suppress generation of the road edge assist steering torque in dependence on a current steering angle of the host vehicle; and/or a determined radius of curvature of a lane of travel. The steering angle may be determined with reference to a steering angle sensor. For example, the road edge assist steering torque may be suppressed if the radius of curvature is less than 1500 metres. The radius of curvature of a lane of travel may be determined with reference to map data, for example by cross-referencing a geospatial location of the host vehicle with map data.

The control system may be configured to suppress generation of the road edge assist steering torque in dependence on a determination that an operating condition of one or more other vehicle systems are active. For example, the road edge assist steering torque may be suppressed if an anti-lock brake system (ABS) intervention is identified; and/or a dynamic stability control (DSC) system intervention is identified. Alternatively, or in addition, the road edge assist steering torque may be suppressed if a manual braking event is detected, for example a brake pressure greater than a predefined brake pressure threshold. The brake pressure threshold may, for example, be defined as 17 Bar.

The control system may be configured to enable generation of the road edge assist steering torque in dependence on a determination that the first width is greater than the first threshold. The control system may output a second road edge traversal signal to enable generation of the road edge assist steering torque. The second road edge traversal signal may be output to the power assist steering system.

The first width may represent the width of the lane of travel extending between a first road edge and at least one first lane marking. The at least one first lane marking may define a first lateral limit of the lane of travel. The at least one first lane marking may, for example, comprise central road markings on a road consisting of first and second lanes of travel. The first road edge may represent a lateral limit or extent of the road. The first road edge may, for example, comprise a verge. The first road edge may define a transition from a metalled surface to an un-metalled surface.

The control system may be configured to determine when the host vehicle approaches or traverses the road edge. An activation zone may be defined within a predefined distance of the road edge. The predefined distance may, for example, be defined as 10 cm, 20 cm, 30 cm. The control system may be configured to determine when the host vehicle enters the activation zone. The references herein to the host vehicle approaching or traversing the road edge may comprise determining that the host vehicle has entered an activation zone defined with reference to the road edge (i.e. determining that the host vehicle is within a predefined distance of the road edge). The control system may be configured to generate the road edge assist steering torque when the host vehicle enters the activation zone.

When the first width is less than the first threshold, the control system may suppress generation of the road edge assist steering torque in dependence on a determination that the host vehicle is approaching or traversing the road edge.

The control system may be configured to determine when the host vehicle approaches or traverses the at least one first lane marking. When the first width is less than the first threshold, the control system may be configured to enable generation of a lane assist steering torque in dependence on a determination that the host vehicle is approaching or traversing the at least one first lane marking. The control system may optionally suppress generation of the road edge assist steering torque in dependence on a determination that the host vehicle is approaching or traversing the road edge.

The first width may represent the width of the first lane of travel between a first road edge and a second road edge. The first lane of travel may correspond to the width of the road. The road may, for example, consist of a single lane of travel.

The control system may be configured to suppress generation of the road edge assist steering torque in dependence on a determination that the first width is greater than the first threshold. The control system may output a first road edge traversal signal for suppressing generation of the road edge assist steering torque. The first road edge traversal signal may be output to the power assist steering system.

The control system may be configured to enable generation of the road edge assist steering torque in dependence on a determination that the first width is less than the first threshold. The control system may output a second road edge traversal signal to enable generation of the road edge assist steering torque. The second road edge traversal signal may be output to the power assist steering system.

The control system may be configured to receive a vehicle speed signal representing a reference speed of the host vehicle. The control system may be configured to suppress generation of the road edge assist steering torque when the reference speed is less than or greater than a predefined speed threshold. The control system may be configured to suppress generation of the road edge assist steering torque when the reference speed of the host vehicle is greater than a first speed threshold and/or less than a second speed threshold. For example, the first speed threshold may be 64 km/h; and the second speed threshold may be 120 km/h.

The control system may be configured to control generation of the road edge assist steering torque in dependence on detection of a vehicle. The vehicle may be identified as a target vehicle which is distinct from the host vehicle. The vehicle may, for example, be an oncoming vehicle having a direction of travel which is the opposite of the host vehicle. The vehicle may be travelling in the same lane of travel as the host vehicle or in a different lane of travel. The control system may be configured to suppress generation of the road edge assist steering torque when the vehicle is detected.

The control system may suppress generation of the road edge assist steering torque in dependence on a determination that the host vehicle is approaching or traversing the road edge and a vehicle is detected.

According to a further aspect of the present invention there is provided a control system for controlling generation of a road edge assist steering torque; the control system comprising one or more controllers, the control system being configured to suppress generation of the road edge assist steering torque when a vehicle is detected. The control system may be configured to control generation of the road edge assist steering torque in dependence on detection of a vehicle.

The control system may be configured to suppress generation of the road edge assist steering torque when the vehicle is detected.

The control system may track movement of the vehicle. The control system may determine an absolute trajectory of the vehicle or may determine a relative trajectory of the vehicle. The control system may determine if the vehicle is travelling in the same direction as the host vehicle. The control system may be configured to enable generation of the road edge assist steering torque when the vehicle is travelling in the same direction as the host vehicle. The control system may determine if the vehicle is travelling in the opposite direction to the host vehicle (i.e. the vehicle is oncoming). The control system may be configured to suppress generation of the road edge assist steering torque when the vehicle is travelling in the opposite direction to the host vehicle.

The road edge assist steering torque may be suppressed when the detected vehicle is within a predetermined range of the host vehicle.

The control system may be configured to suppress generation of the road edge assist steering torque when the vehicle is in the same lane of travel as the host vehicle. The control system may be configured to enable generation of the road edge assist steering torque when the vehicle is in a different lane of travel than that of the host vehicle.

The control system may suppress the generated road edge assist steering torque by reducing a magnitude of the road edge assist steering torque. The road edge assist steering torque may be reduced to a non-zero value less than a default or standard road edge assist steering torque. The road edge assist steering torque may be reduced to zero. The control system may suppress the generated road edge assist steering torque by inhibiting generation of the road edge assist steering torque.

According to a further aspect of the present invention, there is provided a vehicle comprising a control system as described herein.

According to a further aspect of the present invention, there is provided a method of controlling generation of a road edge assist steering torque; the method comprising:
a. determining a first width representing a width of a first lane of travel;
b. comparing the first width to a predefined first threshold; and
c. controlling generation of the road edge assist steering torque in dependence on the comparison of the first width and the first threshold.

The method may comprise enabling generation of the road edge assist steering torque in dependence on a determination that the first width is greater than the first threshold.

The method may comprise suppressing generation of the road edge assist steering torque in dependence on a determination that the first width is less than the first threshold.

The first width may represent the width of the first lane of travel between a first road edge and at least one first lane marking. The method may comprise determining when the host vehicle approaches or traverses the road edge. The method may comprise suppressing generation of the road edge assist steering torque in dependence on a determination that the host vehicle is approaching or traversing the road edge and the first width is less than the first threshold.

The method may comprise determining when the host vehicle approaches or traverses the at least one first lane marking. The method may comprise enabling generation of the road edge assist steering torque in dependence on a determination that the host vehicle is approaching or traversing the at least one first lane marking and the first width is less than the first threshold.

The first width may represent the width of the first lane of travel between a first road edge and a second road edge. The first width may correspond to a total width of the road, i.e. the distance between the first and second road edges.

The method may comprise enabling generation of the road edge assist steering torque in dependence on a determination that the first width is less than the first threshold.

The method may comprise suppressing generation of the road edge assist steering torque in dependence on a determination that the first width is greater than the first threshold.

The method may comprise suppressing generation of the road edge assist steering torque when a vehicle is detected.

According to a further aspect of the present invention there is provided a method of controlling generation of a road edge assist steering torque; the method comprising suppressing generation of the road edge assist steering torque when a vehicle is detected.

The method may comprise suppressing generation of the road edge assist steering torque by reducing a magnitude of the road edge assist steering torque, or by inhibiting the road edge assist steering torque.

The method may comprise tracking movement of the vehicle. The control system may determine an absolute trajectory of the vehicle or may determine a relative trajectory of the vehicle. The method may comprise enabling generation of the road edge assist steering torque when the vehicle is travelling in the same direction as the host vehicle. The method may comprise suppressing generation of the road edge assist steering torque when the vehicle is travelling in the opposite direction to the host vehicle.

The road edge assist steering torque may be suppressed when the detected vehicle is within a predetermined range of the host vehicle.

The method may comprise suppressing the generation of the road edge assist steering torque by reducing a magnitude of the road edge assist steering torque. The road edge assist steering torque may be reduced to a non-zero value which is less than a default or standard road edge assist steering torque. The road edge assist steering torque may be reduced to zero. The control system may suppress the generated road edge assist steering torque by inhibiting generation of the road edge assist steering torque.

According to a further aspect of the present invention there is provided a non-transitory computer-readable medium having a set of instructions stored therein which, when executed, cause a processor to perform the method described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the invention will now be described, by way of example only, with reference to the accompanying drawings, in which:

FIG. 3A illustrates the host vehicle travelling on a first section of road having road markings;

FIG. 3B illustrates the host vehicle travelling on a second section of road without road markings;

DETAILED DESCRIPTION

A control system 1 in accordance with an embodiment of the present invention will now be described with reference to the accompanying figures. The control system 1 is installed in a vehicle 2, referred to herein as the host vehicle 2. The host vehicle 2 in the present embodiment is an automobile, but it will be understood that the controller 1 may be used in other types of land vehicle. The host vehicle 2 is described herein with reference to a reference frame comprising a longitudinal axis X, a transverse axis Y and a vertical axis Z. The host vehicle 2 has a longitudinal centreline CL extending along the longitudinal axis X.

Figure 1:
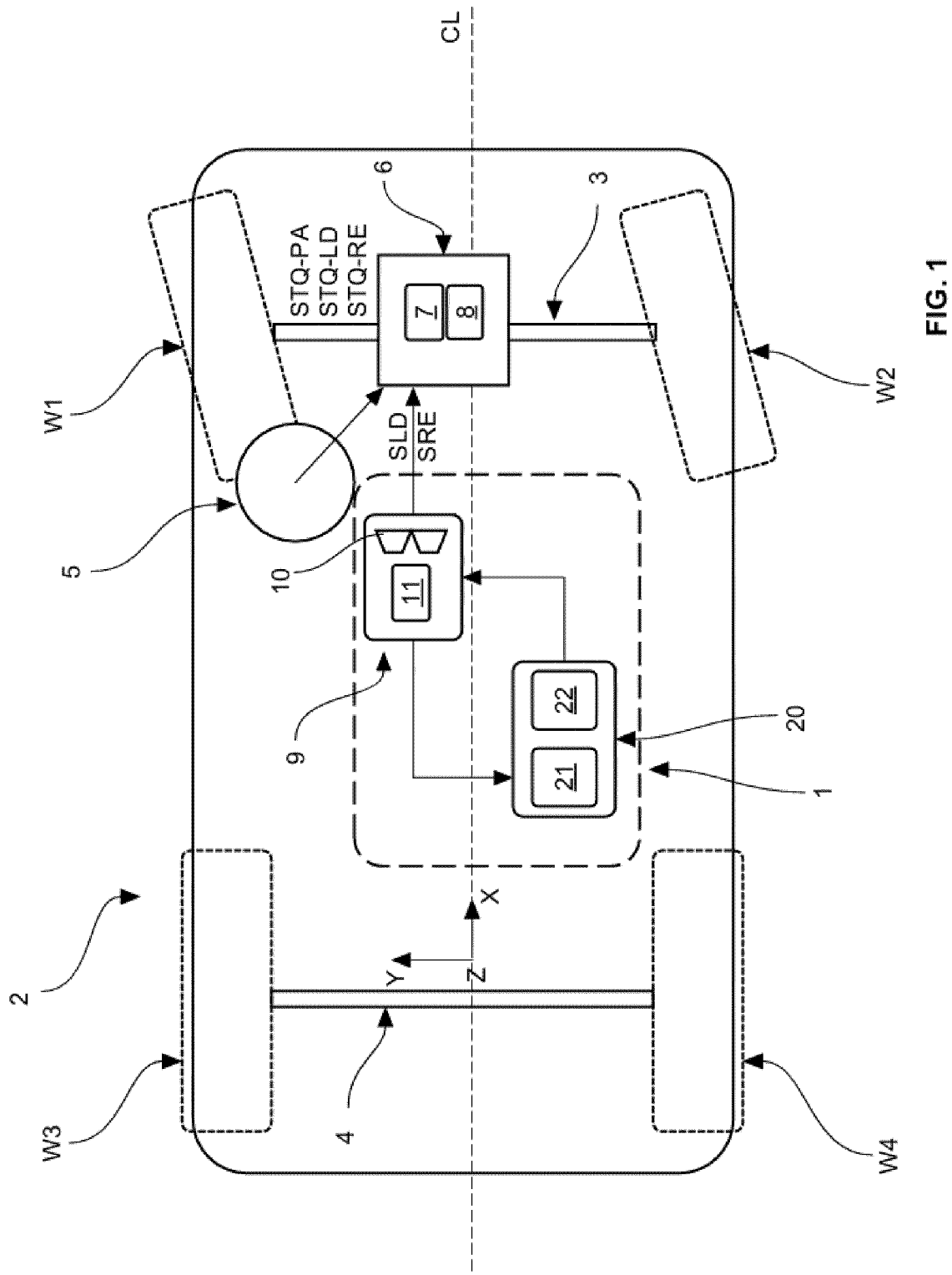
FIG. 1 shows a schematic representation of a host vehicle incorporating a control system in accordance with an embodiment of the present invention.

As illustrated in FIG. 1, the host vehicle 2 comprises four (4) wheels W1-4. The wheels W1-4 are provided on front and rear axles 3, 4. As illustrated in FIG. 1, the first and second wheels W1, W2 provided on the front axle 3 are steerable to control a direction of travel of the host vehicle 2. A driver-operated steering wheel 5 is provided for controlling a steering angle α of the first and second wheels W1, W2 provided on the front axle 3. A power assist steering system 6 is provided to generate a steering assist torque STQ-PA to supplement a steering torque applied STQ-D applied to the steering wheel 5 by the driver. The power assist steering system 6 comprises a power assist steering controller 7; a torque sensor (not shown) for sensing the steering torque applied by the driver to the steering wheel 5; and a power assist steering actuator 8 for generating the steering assist torque STQ-PA. In the present embodiment, the power assist steering system 6 is an electric power assist steering system (EPAS) comprising an electromechanical actuator operable to generate the steering assist torque STQ-PA. Other types of power assist steering actuator 7 may be used, such as a hydraulic actuator. In other embodiments the steering system 6 may be a decoupled steering system, such as a steer by wire system, comprising an actuator at the steering wheel electronically coupled to an actuator at the front or rear axles 3,4.

The host vehicle 2 comprises a lane departure warning system 9 for identifying when the host vehicle 2 is departing the current lane of travel LT-n. As described herein, the lane departure warning system 9 is also suitable for identifying when the host vehicle 2 is approaching or traversing a physical limit or a boundary of the road R on which the host vehicle 2 is travelling. The physical limit or boundary of the road R is referred to herein as a road edge RE. The lane departure warning system 9 is configured to output a lane departure signal SLD upon making a determination that the host vehicle 2 is departing the current lane of travel LT-n. The power assist steering system 6 is configured to generate a lane assist steering torque STQ-LD in dependence on the lane departure signal SLD. The lane assist steering torque STQ-LD is applied as a steering wheel torque overlay to the steering assist torque STQ-PA generated by the power assist steering system 6. The lane departure warning system 9 is configured to output a road edge traversal signal SRE upon making a determination that the host vehicle 2 is approaching or traversing the road edge RE. The road edge traversal signal SRE comprises a steering torque request, a steering torque status signal and a road edge departure system status. The steering torque request may comprise a torque request direction (+ve or −ve) and optionally also a torque request magnitude. The power assist steering system 6 is configured to generate a road edge assist steering torque STQ-RE in dependence on the road edge traversal signal SRE.

The lane departure warning system 9 comprises a sensor unit 10 and an image processing module 11. The sensor unit 10 in the present embodiment comprises an optical camera having a field of view extending forwards in front of the host vehicle 2. The sensor unit 10 may comprise one or more optical cameras, for example a stereo camera. Alternatively, or in addition, the lane departure warning system 9 may utilise other types of sensor, such as a radar system or a LIDAR system, to capture an image of a region in front of the host vehicle 2. The sensor unit 10 in the present embodiment is located behind a rear-view mirror (not shown) provided at the top of the front windshield. Other mounting locations are possible, for example the sensor unit 10 may be provided behind or in a front grille of the host vehicle 2. The lane departure warning system 9 may optionally receive inputs from one or more vehicle systems, for example to determine if the driver has activated side indicators to signal an intended change the lane of travel LT-n. The lane departure warning system 9 may be configured to inhibit output of the lane departure signal SLD, for example if the driver activates the directional (side) indicators. The image processing module 11 receives image data captured by the sensor unit 10. The image data is processed to identify features of the road R on which the host vehicle 2 is travelling. The image data is also processed to detect the road edge RE, for example by identifying a transition or boundary between a road surface which may be relatively smooth (for example defined by asphalt, concrete or other surfacing material) and an adjacent surface which may be relatively rough (for example composed of one or more of the following: grass, mud, gravel, sand and snow).

Figure 2A:
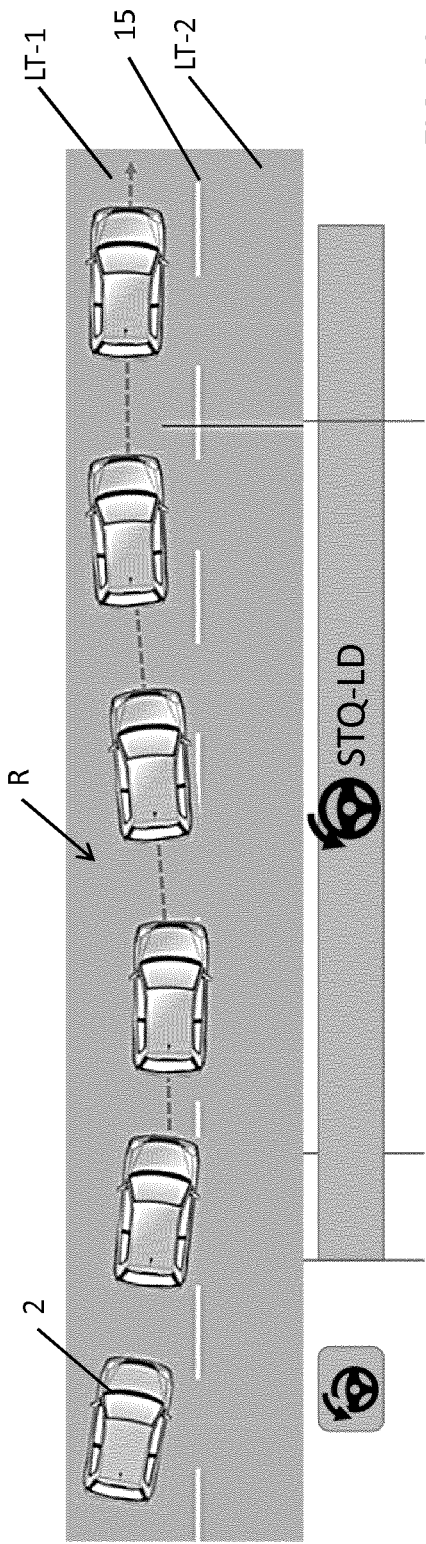
FIG. 2A illustrates generation of a lane keep assist torque for maintaining the host vehicle in current lane of travel.

As illustrated in FIG. 2A, the power assist steering system 6 is operable to implement a lane keep assist (LKA) function in dependence on the lane departure signal SLD generated by the lane departure warning system 9. In use, the power assist steering system 6 may generate a lane assist steering torque STQ-LD when it is determined that the host vehicle 2 is departing a lane of travel LT-n. The lane assist steering torque STQ-LD road edge assist steering torque STQ-RE is applied as a steering wheel torque overlay to the steering assist torque STQ-PA generated by the power assist steering system 6. The lane assist steering torque STQ-LD is transmitted to the steering wheel 5 to provide a haptic signal to the driver of the host vehicle 2. The lane assist steering torque STQ-LD is output to the steering wheel 5 in an appropriate direction to maintain the host vehicle 2 in the current lane of travel LT-n. The magnitude of the lane assist steering torque STQ-LD is controlled such that, if necessary, the driver can override the lane assist steering torque STQ-LD, for example to implement a change in trajectory of the host vehicle 2 to implement a planned change in the lane of travel LT-n. The lane assist steering torque STQ-LD may, for example, have a maximum value of 3 Nm.

Figure 2B:
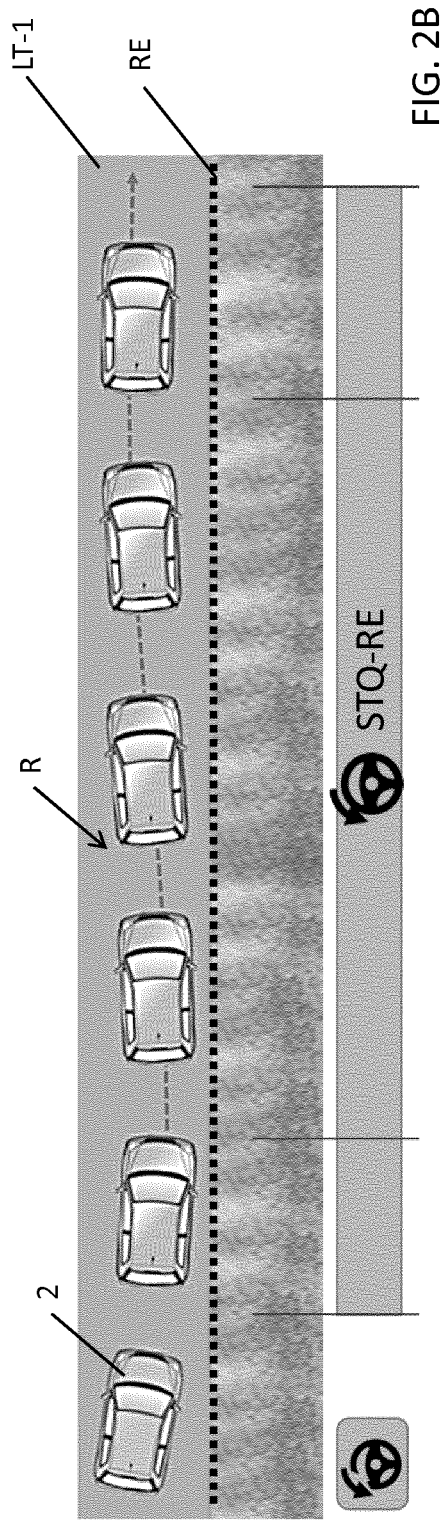
FIG. 2B illustrates generation of a road edge assist torque for maintaining the host vehicle in a current lane of travel.

As illustrated in FIG. 2B, the power assist steering system 6 is operable to implement a road edge lane keep assist (RE-LKA) function in dependence on the road edge traversal signal SRE generated by the lane departure warning system 9. The road edge lane keep assist (RE-LKA) function is intended as an emergency feature and steering assistance and warnings may be displayed when the function is intervening. For example, warnings may be displayed on a display screen. The road edge lane keep assist (RE-LKA) function implemented by the control system 1 can be selectively disabled/enabled by a driver of the host vehicle 2. However, in the present embodiment, the road edge lane keep assist (RE-LKA) function is enabled automatically when the ignition of the host vehicle 2 is switched on. The road edge lane keep assist (RE-LKA) function may operate independently of, or in conjunction with, the lane keep assist (LKA) function. As described herein, the control system 1 is configured to control operation of the road edge lane keep assist (RE-LKA) function. In use, the power assist steering system 6 may generate a road edge assist steering torque STQ-RE when it is determined that the host vehicle 2 is approaching or traversing the identified road edge RE. The road edge assist steering torque STQ-RE is transmitted to the steering wheel 5 to provide a haptic signal to the driver of the host vehicle 2. The road edge assist steering torque STQ-RE is output to the steering wheel 5 in an appropriate direction to maintain the host vehicle 2 on the road. The road edge assist steering torque STQ-RE is applied as a steering wheel torque overlay to the steering assist torque STQ-PA generated by the power assist steering system 6. The road edge assist steering torque STQ-RE provides a corrective steering input upon determination that the host vehicle 2 is traversing or is about to traverse a road lane boundary. If desired, the driver can override the road edge assist steering torque STQ-RE by applying a steering torque STQ-D to the steering wheel 5 which is greater than or equal to a threshold override torque. The threshold override torque in the present embodiment is predefined as 3 Nm in either direction. It will be understood that the threshold override torque may be defined as a value less than 3 Nm or greater than 3 Nm. The magnitude of the road edge assist steering torque STQ-RE is controlled such that, if necessary, the driver can apply a steering torque to the steering wheel 5 to override the road edge assist steering torque STQ-RE, for example to implement a change in trajectory of the host vehicle 2 to pass another vehicle on the road. The road edge assist steering torque STQ-RE may, for example, have a maximum value of 3 Nm. As described herein, the control system 1 in accordance with the present embodiment is operative to control the generation of the road edge assist steering torque STQ-RE.

The operation of the control system 1 will now be described herein with reference to a first road section R-A shown in FIG. 3A; and a second road section R-B shown in FIG. 3B. The first and second road sections R-A, R-B can form part of the same road R or may be separate roads R. The first and second road sections R-A, R-B each comprise a single carriageway (also known as an "undivided highway") without a central reservation. The first road section R-A consists of a two-lane road (also known as a "two-lane highway") having first and second lanes of travel LT-n for vehicles travelling in respective first and second directions. The second road section R-B consists of a single-lane road (also known as a "single-lane highway") having a single lane of travel LT-n which is used by vehicles travelling in first and second directions. The single-lane road may, for example, comprise vehicle passing points to facilitate progress of vehicles travelling in opposite directions. It will be understood that the present invention is not limited to operation on roads having the features illustrated in the first and second road sections R-A, R-B.

The first and second road sections R-A, R-B each comprise first and second road edges RE-1, RE-2. In the illustrated example, the first and second road edges RE-1, RE-2 mark the lateral extent of the metalled road surface. It will be understood that one or both of the first and second road edges RE-1, RE-2 may comprise a barrier or partition member, for example separating lanes of a dual carriageway (also known as a "divided highway"). The first and second road sections R-A, R-B may also comprise road markings (denoted herein generally by the reference numeral 14). The first road section R-A has road markings 14 comprising a central road marking 15. The central road marking 15 may comprise a centre line of the road section R. Alternatively, or in addition, the road markings 14 may comprise one or more lane markings (not shown) representing a boundary between lanes of travel LT-n for vehicles travelling in the same direction or in opposite directions. The lane markings may comprise lane lines. The central road marking 15 and/or the lane marking(s) may each comprise a continuous line (not shown) or an interrupted line (as shown in FIG. 3A). The road marking(s) 14 may each comprise one line or multiple lines, for example in the form of a single line or a double line. The central road marking 15 typically differentiates between sections of the first road section R-A intended for travel in opposite directions. Alternatively, or in addition, the road marking(s) 14 may comprise edge lines to indicate an edge of an inboard lane; the edge lines may be separated from the associated first or second road edge RE-1, RE-2. The first road section R-A shown in FIG. 3A includes central road markings 15 and lane markings defining a plurality of lanes of travel LT-n. The second road section R-B shown in FIG. 3B does not have any road markings 14, i.e. there are no central road markings 15 or lane markings.

The lane departure warning system 9 is operable to monitor the image data captured by the sensor unit 10 at least substantially in real time. The image processing module 11 analyses the image data to identify the first road edge RE-1 and/or the second road edge RE-2. The image processing module 11 may, for example, identify changes in the contrast and/or colour of the image data which may be indicative of the first and/or second road edge RE-1, RE-2. Other image processing techniques may be used to identify the first and second road edges RE-1, RE-2. The image processing module 11 is configured also to identify any road markings 14 present on the road R. The image processing module 11 may, for example, utilise image processing techniques to identify continuous or interrupted lines extending in a forward direction (i.e. parallel to the centre line CL of the host vehicle 2). The lane departure warning system 9 identifies the road marking 14 closest to the longitudinal centreline CL of the host vehicle 2. If the host vehicle 2 crosses the identified road marking 14, the lane departure warning system 9 determines that the host vehicle 2 is departing from the current lane of travel LT-n. The lane departure warning system 9 then outputs the lane departure signal SLD. The lane departure signal SLD includes an indication of whether the host vehicle 2 is traversing the lane markings on a right-hand side or a left-hand side of the host vehicle 2. The power assist steering system 6 receives the lane departure signal SLD and is operable to generate the lane assist steering torque STQ-LD in a direction suitable for maintaining the host vehicle 2 in the current lane of travel LT-n. The lane departure warning system 9 identifies the road edge RE-1, RE-2 closest to the longitudinal centreline CL of the host vehicle 2. If the host vehicle 2 approaches or crosses the identified road edge RE-1, RE-2, the lane departure warning system 9 determines that the host vehicle 2 has entered an activation zone and intervenes by outputting the road edge traversal signal SRE. The activation zone may be defined as a region within a predefined range of the identified road edge RE-1, RE-2. The road edge traversal signal SRE includes an indication of whether the host vehicle 2 is traversing the first road edge RE-1 disposed on a first side of the host vehicle 2, or the second road edge RE-2 disposed on a second side of the host vehicle 2. The power assist steering system 6 receives the road edge traversal signal SRE and is operable to generate the road edge assist steering torque STQ-RE in a direction suitable for maintaining the host vehicle 2 between the first and second road edges RE-1, RE-2. In order to notify the driver that the road edge lane keep assist (RE-LKA) function is active, an icon (not shown) representing the lateral boundaries of a lane of travel LT-n may be selectively illuminated. By way of example, a left-hand side of the icon may be illuminated when the road edge lane keep assist (RE-LKA) function is active to generate a lane assist steering torque STQ-LD to steer the host vehicle 2 away from the first road edge RE-1 on the left-hand side of the host vehicle 2. Conversely, a right-hand side of the icon may be illuminated when the road edge lane keep assist (RE-LKA) function is active to generate a lane assist steering torque STQ-LD to steer the host vehicle 2 away from the second road edge RE-2 on the right-hand side of the host vehicle 2.

Figure 4:
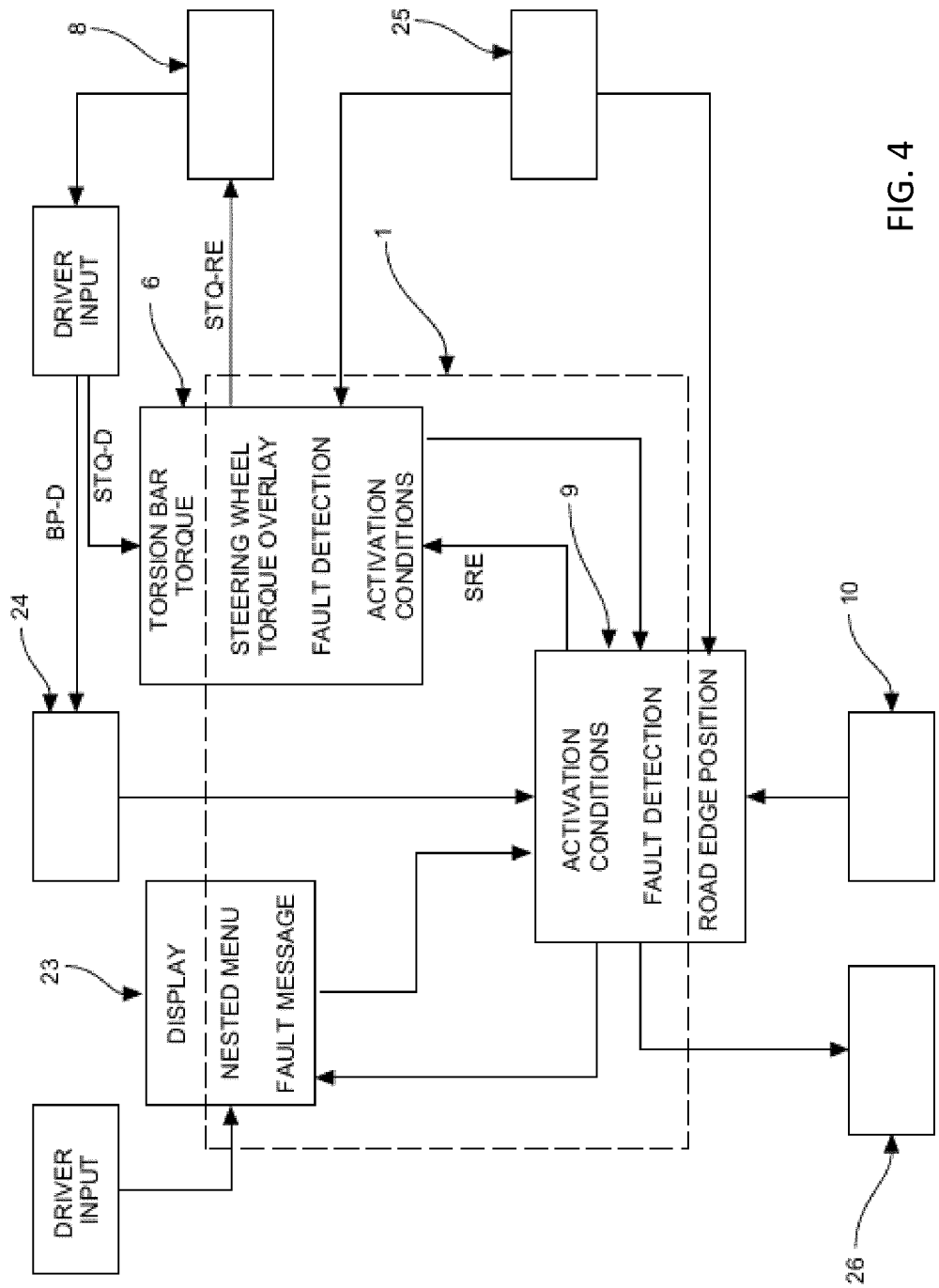
FIG. 4 is a schematic representation of the integration of the control system in the host vehicle.

The control system 1 according to the present embodiment comprises a controller 20 having at least one electronic processor 21 and a system memory 22, as shown schematically in FIG. 1. A set of computational instructions is stored in the system memory 22 and, when executed, cause the processor 21 to implement the method(s) described herein. In the present embodiment, the control system 1 is incorporated into the lane departure warning system 9. In a variant, the control system 1 could be a separate controller or could be incorporated into the power assist steering controller 7. The implementation of the control system 1 within the host vehicle 2 is illustrated in FIG. 4. The host vehicle 2 comprises an instrument panel cluster 23, a vehicle dynamic status module 24, a body control module 25, and (optionally) a head-up-display 26. The driver can selectively activate and deactivate the road edge lane keep assist (RE-LKA) function of the control system 1 via the instrument panel cluster 23 for example by selecting one or more menu options. Driver inputs to the instrument panel cluster 23 are output to the lane departure warning system 9. The vehicle status module 25 monitors driver inputs, including driver steering inputs STQ-D and driver brake inputs BP-D. The vehicle status module 25 outputs vehicle information to the lane departure warning system 9, including one or more of the following: an anti-lock brake (ABS) status, a dynamic stability control (DSC) status, a vehicle reference speed (VREF), a vehicle speed quality factor QF signal, a brake pressure signal and a brake pressure quality factor QF signal. The lane departure warning system 9 outputs status information to the instrument panel cluster 23 and/or to the head-up display 26. The status information may include one or more of the following: an operating status (enabled/disabled), a steering intervention status, a fault detection signal, a driver input acknowledgement and an input request. The instrument panel cluster 23 and/or the head-up display 26 may display status information, for example to indicate one or more of the following: a system status (enabled/disabled), a steering intervention status (for example, to indicate an active steering intervention) and/or a fault status. The body control module 25 outputs car configuration data to the power assist steering module 6 and the lane departure warning system 9. The body control module 25 also outputs a power mode signal to the lane departure warning system 9.

The control system 1 is configured to identify scenarios in which generation of the road edge assist steering torque STQ-RE may be undesirable and to implement an appropriate control strategy selectively to enable or suppress operation of the lane departure warning system 9. Examples of these scenarios will now be described with reference to FIGS. 3A and 3B.

In a first scenario illustrated in FIG. 3A, the host vehicle 2 is travelling along the first road section R-A comprising road markings in the form of the central road markings 15. The width of the lane of travel LT-n is relatively small in relation to the width of the host vehicle 2. The lane of travel LT-n in the illustrated arrangement extends from the first road edge RE-1 to the central road markings 15. It is recognised that the driver may wish to steer the host vehicle 2 up to and potentially over the road edge RE-1, RE-2 and/or the lane markings, for example to increase the clearance between the host vehicle 2 and an oncoming vehicle (denoted generally by the reference numeral 30 in FIGS. 3A and 3B). In a second scenario illustrated in FIG. 3B, the host vehicle 2 is travelling along the second road section R-B. The total width of the second road section R-B (i.e. the transverse dimension extending between the first and second road edges RE-1, RE-2) is relatively small in relation to the width of the host vehicle 2. It is recognised that the driver may wish to steer the host vehicle 2 up to and potentially over the determined road edge RE-1, RE-2, for example to pass an oncoming vehicle (denoted generally by the reference numeral 30 in FIGS. 3A and 3B). In the aforementioned first and second scenarios, the generation of the road edge assist torque STQ-RE may be undesirable, for example if the driver has made a conscious decision to steer the host vehicle 2 up to and potentially over the road edge RE-1, RE-2. The control system 1 is configured to implement an appropriate control strategy automatically to suppress generation of the road edge assist torque STQ-RE.

The image processing module 11 analyses the image data to identify road markings 14, such as the central road marking 15 and/or the lane marking(s). If road markings 14 are identified, the image processing module 11 identifies the lane of travel LT-n in which the host vehicle 2 is currently travelling (referred to herein as the current lane of travel LT-n). The image processing module 11 determines a first width WL1 of the current lane of travel LT-n. The control system 1 compares the determined first width lane WL1 with a predefined first threshold WT1. If the determined first width WL1 is less than or equal to the first threshold WT1, the control system 1 is configured to suppress the output of the road edge traversal signal SRE. The road edge assist steering torque STQ-RE is suppressed and the haptic signal cannot be generated at the steering wheel 5. If the determined first width WL1 is greater than the first threshold WT1, the control system 1 is configured to enable the output of the road edge traversal signal SRE. If the host vehicle 2 approaches or traverses the first road edge RE-1 or the second road edge RE-2, the road edge assist steering torque STQ-RE can be transmitted to the steering wheel 5 to provide a haptic signal to the driver of the host vehicle 2. In the first scenario illustrated in FIG. 3A, the control system 1 enables the output of the road edge traversal signal SRE when the first width WL1 of the current lane of travel LT-n in the first road section R-A is greater than the first threshold WT1. However, the control system 1 suppresses the output of the road edge traversal signal SRE when the first width WL1 of the current lane of travel LT-n in the first road section R-A is less than or equal to the first threshold WT1.

The operation of the control system 1 to control generation of the road edge traversal signal SRE in dependence on the determined first width WL1 will now be described. The image processing module 11 identifies the first road edge RE-1 and the central road marking 15. The image processing module 11 determines a first width WL1 between the first road edge RE-1 and the central road marking 15 identified within the image data captured by the sensor unit 10. The first width WL1 represents the width of the current lane of travel LT-n. The controller 20 is configured to compare the first width WL1 to the predefined first threshold WT1. In the present embodiment, the first threshold WT1 is defined as 3.1 metres (120 inches). The first threshold WT1 may be defined as a value which is less than 3.1 metres (120 inches) or is greater than 3.1 metres (120 inches). If the controller 20 determines that the first width WL1 is greater than the first threshold WT1 (WL1>WT1), a first enable road edge traversal signal is output to enable the output of the road edge traversal signal SRE. The first enable road edge traversal signal remains active as long as the first width WL1 is greater than the first threshold WT1. In dependence on receipt of the first enable road edge traversal signal, the lane departure warning system 9 is operable to output the road edge traversal signal SRE when the host vehicle 2 approaches or crosses the road edge RE-1. If the controller 20 determines that the first width WL1 is less than or equal to the first threshold WT1 (WL1=<WT1), a first suppress road edge traversal signal is output to suppress or inhibit the output of the road edge traversal signal SRE. The first suppress road edge traversal signal remains active as long as the first width WL1 is less than or equal to the first threshold WT1. In dependence on receipt of the first suppress road edge traversal signal, the lane departure warning system 9 is operable to suppress or inhibit the output of the road edge traversal signal SRE when the host vehicle 2 approaches or crosses the road edge RE-1. In the present embodiment, the first enable road edge traversal signal and the first suppress road edge traversal signal are output to the lane departure warning system 9. In a variant, the first enable road edge traversal signal and the first suppress road edge traversal signal may be output to the power assist steering system 6 respectively to enable and suppress generation of the road edge assist steering torque STQ-RE.

In the arrangement illustrated in FIG. 3A, there will be a reduced clearance between the host vehicle and an oncoming vehicle 30 as the width of the first road section R-A narrows. The reduced clearance may cause the driver of the host vehicle 2 to feel more comfortable driving at a position at or over the first road edge RE-1 so as to increase clearance between the host vehicle 2 and the oncoming vehicle 30.

If the image processing module 11 is unable to identify any road markings 14, for example the analysis does not identify any central road marking 15 and/or any lane marking(s), the image processing module 11 determines a second width WL2 representing a total width of the road R on which the host vehicle 2 is travelling. The second width WL2 corresponds to a transverse distance between the first road edge RE-1 and the second road edge RE-2. The determined second width WL2 is compared to a predefined second threshold WT2. If the second width WL2 is less than the second threshold WT2, the control system 1 is configured to enable the output of the road edge traversal signal SRE. If the host vehicle 2 approaches or traverses the first road edge RE-1 or the second road edge RE-2, the road edge assist steering torque STQ-RE can be transmitted to the steering wheel 5 to provide a haptic signal to the driver of the host vehicle 2. If the second width WL2 is greater than or equal to the second threshold WT2, the control system 1 is configured to suppress the output of the road edge traversal signal SRE. The road edge assist steering torque STQ-RE is suppressed and the haptic signal is not generated at the steering wheel 5 if the host vehicle 2 approaches or crosses the first or second road edge RE-1, RE-2. In the second scenario illustrated in FIG. 3A, the control system 1 enables the output of the road edge traversal signal SRE when the second width WL2 of the second road section R-B is less than the second threshold WT2. However, the control system 1 suppresses the output of the road edge traversal signal SRE when the second width WL2 of the second road section R-B is greater than or equal to the second threshold WT2.

The operation of the control system 1 to control generation of the road edge traversal signal SRE in dependence on the determined second width WL2 will now be described. The image processing module 11 identifies the first road edge RE-1 and the second road edge RE-2. The image processing module 11 determines the second width WL2 between the first and second road edges RE-1, RE-2 identified within the image data captured by the sensor unit 10. The second width WL2 represents the width of the current road section R-B. The controller 20 is configured to compare the second width WL2 to the predefined second threshold WT2. In the present embodiment, the second threshold WT2 is defined as 4 metres (160 inches). The second threshold WT2 may be defined as a value which is less than 4 metres (160 inches) or is greater than 4 metres (160 inches). If the controller 20 determines that the second width WL2 is less than the second threshold WT2 (WL2<WT2), a second enable road edge traversal signal is output to enable the output of the road edge traversal signal SRE. The second enable road edge traversal signal remains active as long as the second width WL2 is less than the second threshold WT2. In dependence on receipt of the second enable road edge traversal signal, the lane departure warning system 9 is operable to output the road edge traversal signal SRE when the host vehicle 2 approaches or crosses the road edge RE-1. If the controller 20 determines that the second width WL2 is greater than or equal to the second threshold WT2 (WL2>=WT2), a second suppress road edge traversal signal is output to suppress or inhibit the output of the road edge traversal signal SRE. The second suppress road edge traversal signal remains active as long as the second width WL2 is greater than or equal to the second threshold WT2. In dependence on receipt of the second suppress road edge traversal signal, the lane departure warning system 9 is operable to suppress or inhibit the output of the road edge traversal signal SRE when the host vehicle 2 approaches or crosses the road edge RE-1. In the present embodiment, the second enable road edge traversal signal and the second suppress road edge traversal signal are output to the lane departure warning system 9. In a variant, the second enable road edge traversal signal and the second suppress road edge traversal signal may be output to the power assist steering system 6 respectively to enable and suppress generation of the road edge assist steering torque STQ-RE.

In the arrangement illustrated in FIG. 3B, when the second width WL2 is less than the second threshold WT2, there is insufficient space available for two-way traffic on the road R. The host vehicle 2 is therefore unable to pass the oncoming vehicle 30 and the second enable road edge traversal signal is generated to help ensure that the host vehicle 2 remains within the confines of the second road section R-B, i.e. between the first and second road edges 3-1, RE-2. As the second width WL2 increases, there is sufficient space for two-way traffic within the second road section R-B but the road markings 14 remain absent. As the second road section R-B remains narrow, the driver of the host vehicle 2 may choose to approach or cross the first road edge RE-1 when passing an oncoming vehicle 30. In this situation, the controller 20 outputs the second suppress road edge traversal signal to suppress or inhibit the output of the road edge traversal signal SRE.

The control system 1 may optionally be configured to compare the first width WL1 and/or the second width WL2 to a third threshold WT3. The third threshold WT3 defines an upper operating threshold. The third threshold WT3 is predefined and may, for example, be 4 metres (160 inches). The third threshold WT3 may have a discrete value which is greater than 4 metres (160 inches) or less than 4 metres (160 inches). If the control system 1 determines that the first width WL1 and/or the second width WL2 is greater than the third threshold WT3, the controller 20 outputs a third suppress road edge traversal signal to suppress or inhibit the output of the road edge traversal signal SRE. By way of example, the controller 20 may compare the second width WL2 representing the total width of the road 2 to the third threshold WT3. If the controller 20 determines that the second width WL2 is greater than the third threshold WT3, the third suppress road edge traversal signal is output in order to suppress the output of the road edge traversal signal SRE.

Figure 5:
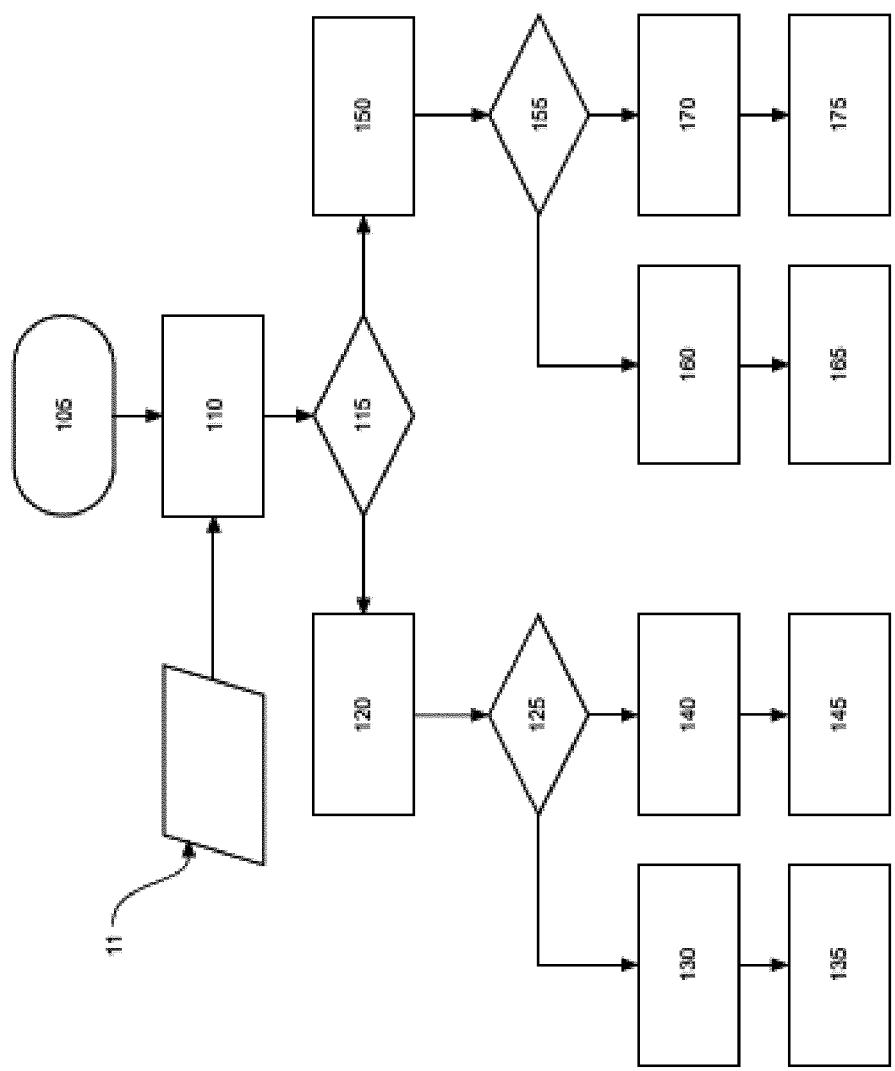
FIG. 5 shows a block diagram representing operation of the control system in accordance with an embodiment of the present invention.

A block diagram 100 representing operation of the control system 1 is shown in FIG. 5. The control system 1 is activated (BLOCK 105). The control system 1 communicates with the image processing module 11 (BLOCK 110). The control system 1 interrogates the image processing module 11 to determine if road markings 14 have been identified in the image data received from the sensor unit 10 (BLOCK 115). The control system 1 is operable in first and second operating modes depending on whether road markings 14 are identified.

If the interrogation of the image processing module 11 determines that road markings 14 have been identified, the control system 1 operates in a first operating mode and determines the first width WL1 of the current lane of travel LT-n (BLOCK 120). The first width WL1 is then compared to the first threshold WT1 (BLOCK 125). If the first width WL1 is greater than the first threshold WT1 (WL1>WT1), the first enable road edge traversal signal is output (BLOCK 130). The lane departure warning system 9 is operable to output the road edge traversal signal SRE while the first enable road edge traversal signal is active. The lane departure warning system 9 monitors the position of the host vehicle 2 on the current section of the road R and outputs the road edge traversal signal SRE in dependence on determining that the host vehicle 2 is approaching or traversing the first or second road edge RE-1, RE-2 (BLOCK 135). If the first width WL1 is less than or equal to the first threshold WT1 (WL1=<WT1), the first suppress road edge traversal signal is output (BLOCK 140). The lane departure warning system 9 is inhibited from outputting the road edge traversal signal SRE while the first suppress road edge traversal signal is active. The lane departure warning system 9 monitors the position of the host vehicle 2 in the current section of the road R but is inhibited from outputting the road edge traversal signal SRE if the lane departure warning system 9 determines that the host vehicle 2 is departing the current lane of travel LT-n (BLOCK 145). The power assist steering 6 does not generate the road edge assist steering torque STQ-RE.

If the interrogation of the image processing module 11 determines that road markings 14 have not been identified, the control system 1 operates in a second operating mode and determines the second width WL2 of the current section of road R-B (BLOCK 150). The second width WL2 is then compared to the second threshold WT2 (BLOCK 155). If the second width WL2 is less than the second threshold WT2 (WL2<WT2), the second enable road edge traversal signal is output (BLOCK 160). The lane departure warning system 9 monitors the position of the host vehicle 2 relative to the first and second road edges RE-1, RE-2 and is operable to output the road edge traversal signal SRE while the first enable road edge traversal signal is active. The lane departure warning system 9 outputs the road edge traversal signal SRE in dependence on determining that the host vehicle 2 is approaching or traversing the first or second road edge RE-1, RE-2 (BLOCK 165). If the second width WL1 is greater than or equal to the second threshold WT2 (WL2>WT2), the second suppress road edge traversal signal is output (BLOCK 170). The lane departure warning system 9 is inhibited from outputting the road edge traversal signal SRE while the first suppress road edge traversal signal is active. The lane departure warning system 9 monitors the position of the host vehicle 2 relative to the first and second road edges RE-1, RE-2, but is inhibited from outputting the road edge traversal signal SRE when the lane departure warning system 9 determines that the host vehicle 2 is approaching or traversing the first or second road edge RE-1, RE-2 (BLOCK 175). The power assist steering 6 does not generate the road edge assist steering torque STQ-RE.

The control system 1 and the lane departure warning system 9 operate continuously by way of default setting. The control system 1 can switch between the first and second operating modes depending on whether road markings 14 are identified. The control system 1 can thereby reflect changes between the first and second road sections R-A, R-B described herein.

As outlined above, the control system 1 is configured automatically to suppress generation of the road edge assist torque STQ-RE. The road edge assist torque STQ-RE may be suppressed by inhibiting the output of the road edge assist torque STQ-RE to the steering wheel 5 (i.e. STQ-RE=0). Alternatively, the road edge assist torque STQ-RE may be suppressed by reducing the road edge assist torque STQ-RE applied to the steering wheel 5, for example by reducing the road edge assist torque STQ-RE to a non-zero value which is less than a default setting. The magnitude of the road edge assist torque STQ-RE could be modified in dependence on the determined first width LW1 or the second width LW2. For example, the road edge assist torque STQ-RE could be proportional to the determined first width LW1 or the second width LW2.

A further embodiment of the control system 1 will now be described. The further embodiment is a modification of the previous embodiment. Like reference numerals are used for like components in this embodiment.

In the present embodiment, the image processing module 11 is configured to analyse the image data to identify an oncoming vehicle(s) 30. The image processing module 11 may, for example, implement a pattern matching algorithm to identify a shape corresponding to another vehicle 30 in the image data captured by the sensor unit 10. The image processing module 11 can monitor changes in the identified shape with respect to time, for example changes in a size and/or relative movement of the identified shape, to determine whether the vehicle 30 has a movement trajectory towards the host vehicle 2 or away from the host vehicle 2. The image processing module 11 may classify the identified shape as corresponding to an oncoming vehicle 30 if the movement trajectory is in an opposite direction to that of the host vehicle 2. Alternatively, or in addition, the image processing module 11 may classify the identified shape as corresponding to an oncoming vehicle 30 in dependence on its position relative to the host vehicle 2. For example, the image processing module 11 may consider if the other vehicle is in the same lane of travel LT-n as the host vehicle 2 or in a different lane of travel LT-n.

The control system 1 is configured to interrogate the image processing module 11 to determine when an oncoming vehicle 30 is present or absent. If the image processing module 11 determines that there is an oncoming vehicle 30, the controller 20 is configured to output a suppress road edge traversal signal to the lane departure warning system 9. The first suppress road edge traversal signal remains active as long as the oncoming vehicle 30 is identified by the image processing module 11. In dependence on receipt of the first suppress road edge traversal signal, the lane departure warning system 9 is operable to suppress or inhibit the output of the road edge traversal signal SRE when the host vehicle 2 approaches or crosses the road edge RE-1. The controller 20 may be modified to control the output of the road edge traversal signal SRE in dependence on the position of the oncoming vehicle 30 relative to the host vehicle 2. For example, the first suppress road edge traversal signal may be operative to suppress the output of the road edge traversal signal SRE on a side of the host vehicle 2 distal from the oncoming vehicle 30 (for example to enable the host vehicle 2 to approach or cross a first road edge RE-1 to pass the oncoming vehicle) and to enable the output of the road edge traversal signal SRE on a side of the host vehicle 2 proximal to the oncoming vehicle 30 (for example to prevent the host vehicle 2 departing the current lane of travel LT-n and entering a lane of travel LT-n of the oncoming vehicle 30).

Alternatively, or in addition, the control system 1 could be configured to identify an object in a path of the host vehicle 2. The identified object may represent an obstruction to the host vehicle. The object may, for example, be a stationary object located in a current lane of travel LT-n of the host vehicle 2. The object could, for example, be a parked vehicle or the like. The controller 20 may be configured to control the output of the road edge traversal signal SRE in dependence on the identification of an object, for example an object which partially or completely obstructs the current lane of travel LT-n of the host vehicle 2. The controller 20 may optionally be configured to suppress generation of a lane keep assist torque STQ if the object is partially blocking the current lane of travel LT-n and the host vehicle 2 will have to depart from the current lane of travel LT-n to pass the object.

The control system 1 according to the present embodiment may be utilised independently of, or in combination with, the control system 1 described in the previous embodiment. For example, the control system 1 may be activated in dependence on a determined first width WL1 and/or the second width WL2.

The magnitude of the road edge assist torque STQ-RE could be modified in dependence on a determined proximity of the oncoming vehicle 30. For example, the road edge assist torque STQ-RE could be proportional to the distance between the host vehicle 2 and the oncoming vehicle 30.

It will be appreciated that various changes and modifications can be made to the present invention without departing from the scope of the present application.

The road edge lane keep assist (RE-LKA) function may be selectively activated and/or deactivated by a user of the host vehicle 2. It is envisaged that this option will be accessible only via one or more sub-menus in a system menu. It is envisaged that the road edge lane keep assist (RE-LKA) function will default to an activated state each time the ignition of the host vehicle 2 is turned on.

The host vehicle 2 may comprise a sensor (not shown) for detecting when the driver's hands are on or off the steering wheel 5. The sensor may, for example, comprise a driver-facing camera; or a touch sensor disposed in the steering wheel 5. If the sensor determines that one or both of the driver's hands are off the steering wheel, the control system 1 may be configured to enable the road edge lane keep assist (RE-LKA) function irrespective of the first width WL1 or the second width WL2. Thus, the control system 1 may override the first and second suppress road edge traversal signals if one or both of the driver's hands are identified as being off the steering wheel 5.

Further aspects of the present technique are defined in the following numbered clauses:

1. A control system for controlling generation of a road edge assist steering torque at a steering wheel of a host vehicle; the control system comprising one or more controllers, the control system being configured to:
determine a first width representing a width of a first lane of travel; and
comparing the first width to a predefined first threshold;
wherein the control system is configured to control generation of the road edge assist steering torque in dependence on the comparison of the first width and the first threshold.
2. A control system according to clause 1, wherein the control system is configured to enable generation of the road edge assist steering torque in dependence on a determination that the first width is greater than the first threshold.
3. A control system according to clause 1 or clause 2, wherein the control system is configured to suppress generation of the road edge assist steering torque in dependence on a determination that the first width is less than the first threshold.
4. A control system according to any one of clauses 1, 2 or 3, wherein the first width represents the width of the first lane of travel between a first road edge and at least one lane marking.
5. A control system according to clause 4, wherein the control system is configured to:
determine when the host vehicle approaches or traverses the road edge; and
suppress generation of the road edge assist steering torque in dependence on a determination that the host vehicle is approaching or traversing the road edge and the first width is less than the first threshold.
6. A control system according to clause 1, wherein the first width represents the width of the first lane of travel between a first road edge and a second road edge.
7. A control system according to clause 6, wherein the control system is configured to enable generation of the road edge assist steering torque in dependence on a determination that the first width is less than the first threshold.
8. A control system according to clause 6 or clause 7, wherein the control system is configured to suppress generation of the road edge assist steering torque in dependence on a determination that the first width is greater than the first threshold.
9. A control system according to any one of the preceding clauses, wherein the control system is configured to suppress generation of the road edge assist steering torque when a vehicle is detected.
10. A control system according to clause 9, wherein the control system is configured to suppress generation of the road edge assist steering torque when the identified vehicle is moving towards the host vehicle.
11. A control system according to any one of clauses 8, 9 or 10, wherein the control system is configured to suppress generation of the road edge assist steering torque when the identified vehicle is in a different lane of travel than the host vehicle.
12. A control system according to any one of the preceding clauses, wherein the control system is operative to suppress generation of the road edge assist steering torque by reducing a magnitude of the road edge assist steering torque, or by inhibiting the road edge assist steering torque.
13. A vehicle comprising a control system according to any one of the preceding clauses.
14. A method of controlling generation of a road edge assist steering torque; the method comprising:

determining a first width representing a width of a first lane of travel;
comparing the first width to a predefined first threshold; and
controlling generation of the road edge assist steering torque in dependence on the comparison of the first width and the first threshold.
15. A method according to clause 14 comprising enabling generation of the road edge assist steering torque in dependence on a determination that the first width is greater than the first threshold.
16. A method according to clause 14 or clause 15 comprising suppressing generation of the road edge assist steering torque in dependence on a determination that the first width is less than the first threshold.
17. A method according to any one of clauses 14, 15 or 16, wherein the first width represents the width of the first lane of travel between a first road edge and at least one lane marking.
18. A method according to clause 17 comprising:
determining when the host vehicle approaches or traverses the road edge; and
suppressing generation of the road edge assist steering torque in dependence on a determination that the host vehicle is approaching or traversing the road edge and the first width is less than the first threshold.
19. A method according to clause 14, wherein the first width represents the width of the first lane of travel between a first road edge and a second road edge.
20. A method according to clause 19 comprising enabling generation of the road edge assist steering torque in dependence on a determination that the first width is less than the first threshold.
21. A method according to clause 19 or clause 20 comprising suppressing generation of the road edge assist steering torque in dependence on a determination that the first width is greater than the first threshold.
22. A method according to any one of clauses 14 to 21 comprising suppressing generation of the road edge assist steering torque when a vehicle is detected.
23. A method according to any one of clauses 14 to 22 comprising suppressing generation of the road edge assist steering torque by reducing a magnitude of the road edge assist steering torque, or by inhibiting the road edge assist steering torque.
24. A non-transitory computer-readable medium having a set of instructions stored therein which, when executed, cause a processor to perform the method according to any one of clauses 14 to 23.

The invention claimed is:
1. A control system for controlling generation of a road edge assist steering torque at a steering wheel of a host vehicle, the control system comprising one or more controllers, and the control system being configured to:
identify whether any central road markings or lane markings are ahead of the host vehicle;
responsive to determining that central road markings or lane markings are ahead of the host vehicle, operate in a first mode that includes:
determining a first width representing a width of a first lane of travel between a first road edge and at least one lane marking or central road marking; and
comparing the first width to a predefined first threshold;
responsive to determining that central road markings or lane markings are not ahead of the host vehicle, operate in a second mode that includes:
determining a second width representing a total width of a road between the first road edge and a second road edge; and
comparing the second width to only a predefined second threshold different from the predefined first threshold;
wherein the control system is configured to control generation of the road edge assist steering torque in dependence on the comparison of the first width to the predefined first threshold when operating in the first mode and the second width to the predefined second threshold when operating in the second mode, and
wherein the road edge assist steering torque is controlled in dependence on the predefined first threshold and not the predefined second threshold when operating in the first mode, and is controlled in dependence on the predefined second threshold and not the predefined first threshold when operating in the second mode.
2. The control system according to claim 1, wherein the control system is configured to enable generation of the road edge assist steering torque in dependence on a determination that the first width is greater than the first threshold.
3. The control system according to claim 2, wherein the control system is configured to suppress generation of the road edge assist steering torque in dependence on a determination that the first width is less than the first threshold.
4. The control system according to claim 3, wherein the control system is configured to enable generation of the road edge assist steering torque in dependence on a determination that the second width is less than the second threshold.
5. The control system according to claim 4, wherein the control system is configured to suppress generation of the road edge assist steering torque in dependence on a determination that the second width is greater than the second threshold.
6. The control system according to claim 1, wherein the control system is configured to:
determine when the host vehicle approaches or traverses the first road edge; and
suppress generation of the road edge assist steering torque in dependence on a determination that the host vehicle is approaching or traversing the first road edge and the first width is less than the first threshold.
7. The control system according to claim 1, wherein the control system is configured to enable generation of the road edge assist steering torque in dependence on a determination that the first width is less than the first threshold.
8. The control system according to claim 7, wherein the control system is configured to suppress generation of the road edge assist steering torque in dependence on a determination that the first width is greater than the first threshold.
9. The control system according to claim 1, wherein the control system is configured to suppress generation of the road edge assist steering torque when a vehicle is detected, and optionally wherein the control system is configured to suppress generation of the road edge assist steering torque when the identified vehicle is moving towards the host vehicle.
10. The control system according to claim 9, wherein the control system is configured to suppress generation of the road edge assist steering torque when the identified vehicle is in a different lane of travel than the host vehicle.
11. The control system according to claim 1, wherein the control system is operative to suppress generation of the road edge assist steering torque by reducing a magnitude of the road edge assist steering torque, or by inhibiting the road edge assist steering torque.

12. The host vehicle comprising the control system according to claim 1.

13. A method of controlling generation of a road edge assist steering torque, the method comprising:
    identifying that central road markings or lane markings are present on a first road segment ahead of a vehicle, and responsive to the identifying that central road markings or lane markings are present on the first road segment ahead of the vehicle, operating in a first mode, wherein operating in the first mode includes determining a first width representing a width of a first lane of travel between a first road edge of the first road segment and at least one lane marking or central road marking of the first road segment, comparing the first width to a predefined first threshold, and controlling generation of the road edge assist steering torque in dependence on the comparison of the first width to the first threshold;
    identifying that central road markings or lane markings are not present on a second road segment ahead of the vehicle, and responsive to the identifying that central road markings or lane markings are not present on the second road segment ahead of the vehicle, operating in a second mode, wherein operating in the second mode includes determining a second width representing a total width of a road between a first road edge of the second road segment and a second road edge of the second road segment, comparing the second width to a only predefined second threshold different from the first threshold, and controlling generation of the road edge assist steering torque in dependence on the comparison of the second width to the second threshold;
    wherein the road edge assist steering torque is controlled in dependence on the predefined first threshold and not the predefined second threshold responsive to operating in the first mode, and is controlled in dependence on the predefined second threshold and not the predefined first threshold responsive to operating in the second mode.

14. A non-transitory computer-readable medium having a set of instructions stored therein which, when executed, cause a processor to perform the method according to claim 13.

15. The method of claim 13, wherein controlling generation of the road edge assist steering torque in dependence on the comparison of the first width to the first threshold comprises enabling generation of the road edge assist steering torque in dependence on a determination that the first width is greater than the first threshold and suppressing generation of the road edge assist steering torque in dependence on a determination that the first width is less than the first threshold.

16. The method of claim 15, wherein controlling generation of the road edge assist steering torque in dependence on the comparison of the second width to the second threshold comprises enabling generation of the road edge assist steering torque in dependence on a determination that the second width is less than the second threshold and suppressing generation of the road edge assist steering torque in dependence on a determination that the second width is greater than the second threshold.

17. A control system for controlling generation of a road edge assist steering torque at a steering wheel of a host vehicle, the control system comprising one or more controllers, the control system being configured to:
    responsive to the host vehicle traversing a first segment of a road that includes a central lane marking, determine a first width representing a width between a first road edge of the road and the central lane marking of the road;
    compare the first width to a predefined first threshold;
    wherein the control system is configured to not suppress generation of the road edge assist steering torque in dependence on a determination that the first width is greater than the first threshold and to suppress generation of the road edge assist steering torque in dependence on a determination that the first width is less than the first threshold;
    responsive to the host vehicle traversing a second segment of a road that does not include a central lane marking, determine a second width representing a width between the first road edge and a second road edge of the road, wherein the first road edge and the second road edge are detected by identifying a first transition between a road surface of the road and an adjacent first surface and a second transition between the road surface and an adjacent second surface, respectively; and
    compare the second width to only a predefined second threshold;
    wherein the control system is configured to suppress generation of the road edge assist steering torque in dependence on a determination that the second width is greater than the second threshold and to not suppress generation of the road edge assist steering torque in dependence on a determination that the second width is less than the second threshold.

18. The control system of claim 17, wherein the road edge assist steering torque is applied in a direction suitable for maintaining the host vehicle between the first road edge and the second road edge.

* * * * *